(12) United States Patent
Kanter et al.

(10) Patent No.: US 8,385,548 B2
(45) Date of Patent: Feb. 26, 2013

(54) SYSTEM AND METHOD FOR ENTANGLED PHOTONS GENERATION AND MEASUREMENT

(75) Inventors: Gregory S. Kanter, Chicago, IL (US); Shawn Wang, Evanston, IL (US)

(73) Assignee: Nucrypt LLC, Evanston, IL (US)

( * ) Notice: Subject to any disclaimer, the term of this patent is extended or adjusted under 35 U.S.C. 154(b) by 433 days.

(21) Appl. No.: 12/708,184

(22) Filed: Feb. 18, 2010

(65) Prior Publication Data

US 2010/0309469 A1 Dec. 9, 2010

Related U.S. Application Data

(63) Continuation-in-part of application No. 12/372,213, filed on Feb. 17, 2009.

(60) Provisional application No. 61/153,363, filed on Feb. 18, 2009.

(51) Int. Cl.
*H04L 9/00* (2006.01)

(52) U.S. Cl. ............ 380/263; 380/28; 380/47; 380/256; 380/260

(58) Field of Classification Search .................... 380/263
See application file for complete search history.

(56) References Cited

U.S. PATENT DOCUMENTS

| | | | | |
|---|---|---|---|---|
| 6,444,999 B1 * | 9/2002 | Tomita | ............................. | 257/14 |
| 6,473,719 B1 * | 10/2002 | Steenblik | ....................... | 702/181 |
| 6,501,591 B1 * | 12/2002 | Kumar et al. | ................. | 359/330 |
| 6,522,749 B2 * | 2/2003 | Wang | ............................. | 380/263 |
| 6,646,727 B2 * | 11/2003 | Saleh et al. | ..................... | 356/73.1 |
| 6,897,434 B1 * | 5/2005 | Kumar et al. | ............ | 250/227.18 |
| 2002/0030180 A1 * | 3/2002 | Tarumi et al. | ............ | 252/299.61 |
| 2002/0106084 A1 * | 8/2002 | Azuma et al. | ................. | 380/263 |
| 2002/0190349 A1 * | 12/2002 | Maeda et al. | ................. | 257/531 |
| 2002/0191176 A1 * | 12/2002 | Saleh et al. | ..................... | 356/73.1 |
| 2003/0055513 A1 * | 3/2003 | Raussendorf et al. | ............ | 700/1 |
| 2003/0067011 A1 * | 4/2003 | Ando et al. | ..................... | 257/186 |
| 2003/0086138 A1 * | 5/2003 | Pittman et al. | ................. | 359/108 |

* cited by examiner

*Primary Examiner* — Kambiz Zand
*Assistant Examiner* — Yonas Bayou
(74) *Attorney, Agent, or Firm* — Nadya Reingand

(57) ABSTRACT

Apparatus and method for producing quantum entangled signal and idler photon pairs is provided. The apparatus makes use of a nonlinear optical fiber to generate the entangled photons. The use of an external broad band light source for alignment of any downstream measurement apparatuses is disclosed. One or more polarized output signals can be generated at both the signal and idler wavelengths using the alignment source, allowing the downstream measurement apparatuses to be aligned using classical light. Multiple signal and idler wavelengths can be generated and aligned using such a system.

27 Claims, 8 Drawing Sheets

SYSTEM AND METHOD FOR ENTANGLED PHOTONS GENERATION AND MEASUREMENT

CROSS-REFERENCE TO RELATED APPLICATIONS

The present invention claims the benefit of U.S. Ser. No. 61/153,363 filed Feb. 18, 2009 and is also a continuation-in-part of Ser. No. 12/372,213 filed Feb. 17, 2009 which is fully incorporated herein by reference.

STATEMENT REGARDING FEDERALLY SPONSORED RESEARCH OR DEVELOPMENT

The United States Government has certain rights to this invention pursuant to contract No. W911NF-08-C-0101 from the US Army Research Office.

FIELD OF THE INVENTION

The present invention relates to a method of generating and measuring quantum states of light called entangled photons or generating light beams that are quantum correlated. These states have various applications including quantum communication, metrology, and computing.

BACKGROUND

Entangled photon states are special quantum states of light which have been shown to be useful for various applications such as quantum key distribution and quantum metrology. This invention is related to the creation of entangled photon states in a robust, practical, and controllable manner in such a way as to be conveniently measurable. Entangled light can be generated using various nonlinear processes including those in nonlinear crystals, such a periodically poled lithium niobate, as well as using the third order nonlinearity in fiber. The use of fiber is beneficial because it is often desired to inject the entangled photons into fiber in order to propagate them over long distances. By generating the entangled photons directly in fiber one can avoid coupling losses. Other benefits, such as high spatial mode purity and the potential for simple manufacturing, are also realized. We note that entangled light is generated by properly combining quantum correlated light beams, and thus the invention herein is also applicable for generating quantum correlated light beams. However, correlated beams are generally easier to prepare and measure, thus some features of the invention are primarily applicable to entangled states.

Some schemes for realizing entanglement using the nonlinearity of fiber have been specified by the same inventive entity as the present invention in a U.S. Pat. No. 6,897,434 by Kumar et. al. Later work was published which used a modified design in order to make the system more robust and easier to align. Further development of the method was performed in a US Patent Application Pub. No. 20090268276, where certain practical issues especially as pertains to designing the entangled light source to allow for simplified alignment of the downstream measurement apparatus were considered.

It is desirable to engineer an entangled photon source which is simple to align and for which the alignment of the source and the subsequent detection apparatus could be easily automated. For polarization entangled light, the detection apparatus can be a polarization analyzer, of which one implementation is shown in FIG. 1. The detection apparatus detects the paired photons, one photon traditionally called the signal and the other the idler. The signal is input to one polarization analyzer 10 and the idler to another 11. They each contain a series of optical waveplates for causing polarization transformations of the incoming light, in this case a half wave plate 12,13 and a quarter waveplate 14,15 although other types of polarization analyzers can use other components such as variable waveplates and have more or fewer components. The waveplates are mounted on rotatable stages. In FIG. 1 each analyzer also has a rotatable polarizer 16, 17. The polarizers act as polarization projection devices, and can also be realized with polarization beam splitters. The photons exiting the polarization analyzers are detected with single photon detectors 18, 19 at which point the output from each detector is counted and correlated in a processor 20. An optional variable waveplate 21 that can be realized with a liquid crystal phase retarder and which is also on a rotatable platform is inserted before one of the rotatable polarizers. It is the nature of entangled sources that interference can occur in the correlations of the detectors as a function of the angle of the rotatable polarizer, even though the statistics of the singles counts are not polarization dependent. The quality of this interference can be recorded as a two-photon interference (TPI) fringe. In order to record this TPI fringe, the various polarization transformations prior to the polarizer need to be set correctly.

Polarization entangled light is sometimes difficult to measure because the polarization rotations that take place in the fiber connecting the entangled source to the measurement device need to be properly accounted for. There are three independent variables that control polarization (to convert any input state of polarization to any output state). Polarization entangled light thus has more degrees of freedom to account for than time-bin entangled light which typically only needs to control optical phase. However, entanglement in the polarization mode can be useful for several reasons including the usually lower cost and lower loss of polarization control devices as compared to the devices needed to manipulate relative phase. Additionally, if one has control over the polarization then hyper-entangled sources entangled in both polarization as well as other modes are possible. Thus this work focuses on polarization entanglement. Since polarization is the harder parameter to control the methods are also suitable to the generation of hyper-entanglement or for systems that need to be able to generate multiple kinds of entanglement that include polarization entanglement.

Since polarization entangled light is effectively depolarized, the photon counts from a particular detector 18, 19 are not a function of the setting of the polarization analyzers 10, 11. However, the analyzer must be set properly in order to make a desired measurement since the correlations between the detectors are a function of the settings of the polarization analyzers. The settings may be relatively easy to determine when using an apparatus that generates entanglement in free-space. In such a case, as in U.S. Pat. No. 6,424,665 by P. G. Kwiat et al., the two orthogonal polarization modes which are the constituent components of the entangled light exit the source, typically at polarizations called H and V, which can be referenced to the physical axis of the laboratory and correspond to horizontal and vertical polarizations. For this reason the polarization analyzer used in U.S. Pat. No. 6,424,665 is a simple half-wave plate followed by a polarizer which is equivalent to a rotatable polarizer. The H and V axis are clearly defined in physical space. There is a relative phase term between the H and V axis that must be set, producing an entangled state of $|H\rangle |H\rangle + e^{i\phi}|V\rangle |V\rangle$, but that phase can be set, for instance, via changing the phase between the H and V axis on the pump wave. This phase typically does not drift considerably over time so the setting of the phase is a rare event.

Adjusting the polarization analyzer to the correct setting becomes more difficult if the entangled light propagates through fiber—particularly if both the signal and idler propagate through different fibers as will generally be the case. This is because there is an unknown polarization rotation due to birefringence in the fiber. Physical space can no longer be used as a reference and the polarization rotation has multiple degrees of freedom. One can not easily set the polarization analyzer using the entangled light directly. This is because the entangled light is not polarized so changing the analyzer settings has no effect on the singles counts. One can search for the settings that lead to the desired coincidence count performance, but this is difficult to do due to the dimensionality of the system and the fact that coincidence counts are relatively rare events. Coincidence counts are rare because losses reduce co-incidences in a quadratic way and entangled light sources typically generate much less than one photon pair per measurement interval in order to reduce multi-photon pair generation events.

It is beneficial if a polarized high-intensity signal is used to aid in alignment. This allows one to produce many alignment photons per each measurement interval whereas the entangled state generation typically generates much less than one photon per measurement interval. A higher photon rate allows for faster measurement speed and therefore faster alignment. The speed at which the system can be aligned is particularly important in fiber, since the birefringence in fiber changes as a function of time. Thus, being able to quickly determine the correct settings for the polarization analyzer, or to periodically readjust the setting, is of importance. Also, it is generally easier to use local singles counts (optical intensity) to set the polarization analyzers, such as using the singles counts from the signal single photon detector 18 as the feedback signal to set the polarization transformations in the signal polarization analyzer 10. Keep in mind that in an actual application the signal and idler photons may be detected in different locations.

A recent US patent application Pub. No. 20090268276 by the same inventive entity describes an invention which allows the polarization analyzers to be set in a two step process. First a polarized alignment laser is used to generate photons at the signal and idler wavelengths with a particular polarization with respect to the constituent orthogonally polarized pulses that are combined to create the entanglement. This allows for each polarization analyzer to be set to, say, minimize this polarized light signal passing through the polarizer thereby aligning two degrees of freedom of the polarization rotation. After this adjustment the entangled source is set to produce entangled light while the rotatable polarizers 16, 17 are rotated by an angle, typically 45 degrees. The phase of the variable waveplate 21, which had its angular position set so that its optical axis is either parallel or perpendicular to the polarized light, is then adjusted in order to maximize the correlations between the signal and idler photons. In this way only one parameter, the phase of the variable waveplate, is adjusted using correlations. Other types of polarization analyzers could be used, with the internal polarized alignment signal of the invention used as a basic tool used to help align the analyzer. The entangled photon source architectures disclosed in US Patent Application Pub. No. 20090268276 is focused on the use of Faraday mirrors in order to maintain a stable polarization.

An architecture for generating entangled photons from a fiber source using Sagnac loops, also known as Sagnac interferometers, was described in U.S. Pat. No. 6,897,434 by Kumar et. al., fully incorporated herein by reference. This method may have some advantages including typically lower insertion loss which is important because loss lowers the correlated entangled photon detection rate in a quadratic way. However, in its original form the architecture requires the manual adjustment of an in-loop polarization controller and uses an undesirable amount of free-space optical components. What is desired is an improved design that could be more easily automated and manufactured thereby making it more practical.

Although the prior art represents fairly practical designs, what is desired is a system that can be easily aligned and whose alignment procedure can be easily automated, which also keeps the cost of the components as low as possible. For instance, the tunable alignment laser used in US patent application #20090268276 is a relatively expensive component which would be beneficial to eliminate. The invention herein makes use of more convenient broad-band sources such as light emitting diodes or the amplified spontaneous emission from an optical amplifier in order to generate an alignment signal. This broad-band source can generate alignment signals at multiple signal/idler wavelengths simultaneously, allowing one alignment source to be used to align multiple detection apparatuses. Additionally, methods are described which allow for the generation of alignment signals with two different non-orthogonal polarizations. By using two different alignment polarizations, the polarization transformations of the polarization analyzers can be completely specified without requiring the use of coincidence counting. Other desired features pertain to reducing the internal losses of the system, and maintaining better control over the generated state so that an entangled state can be both generated and the downstream measurement apparatus subsequently easily aligned to it with high precision. In some cases, the alignment of the downstream measurement apparatus can be done using only singles counts as a feedback signal, as opposed to the more fragile coincidence count measurements. Sometimes it might be useful to be able to generate various states including correlated photons or non-maximally entangled states, and some embodiments of this invention allow such states to be generated if desired.

SUMMARY

This invention describes various techniques which modify the prior art fiber based entangled photon source (EPS) designs to make them robust and practical, including being compatible with automated alignment of the source and subsequent measurement apparatus. Some of the techniques, including the use of an external light source for alignment of the downstream measurement apparatus, where said source can be an inexpensive broad-band source such as a superluminescent light emitting diode or amplified spontaneous emission from an Erbium doped fiber amplifier, are generally applicable to various EPS architectures. The use of a broad-band alignment source is both convenient and allows for the alignment of multiple signal/idler pairs using one alignment source. In some embodiments the alignment source can be used to generate multiple output alignment signals with different non-orthogonal polarizations. Such alignment signals allow the downstream measurement apparatuses to be aligned without requiring the use of coincidence counts as a feedback signal, thereby speeding up and simplifying the alignment procedure. The alignment light is configured so as to generate just one specific output polarization at a time, for instance by using a single alignment source with an external switch to choose between sending the alignment light to one of two different alignment injection ports, or by using multiple alignment sources connected to the multiple alignment source injection ports and turning them on and off as needed. In general all the alignment sources are turned off when an entangled light output is desired.

We also describe a method of monitoring the quality of the setting of the polarization controller inside Sagnac loop EPS architecture so that the polarization controller can be automatically controlled to the desired set-point. In some cases, polarization controllers are also located outside the interferometer containing the nonlinear fiber, and the methods used to set such polarization controllers are described. The polarization controllers can be set to aid in alignment, or to control the splitting ratio of the pump photons into the Sagnac loop so as to generate a particular entangled state, or generate a quantum correlated state. Alignment signals can be time-multiplexed with the entangled signal in order to allow for the settings of the detection system to be constantly monitored and improved as needed. A goal of this invention is to make the generation and subsequent measurement a straight-forward, reliable, and robust process.

DETAILED DESCRIPTION OF THE PREFERRED EMBODIMENT

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Figure 2:
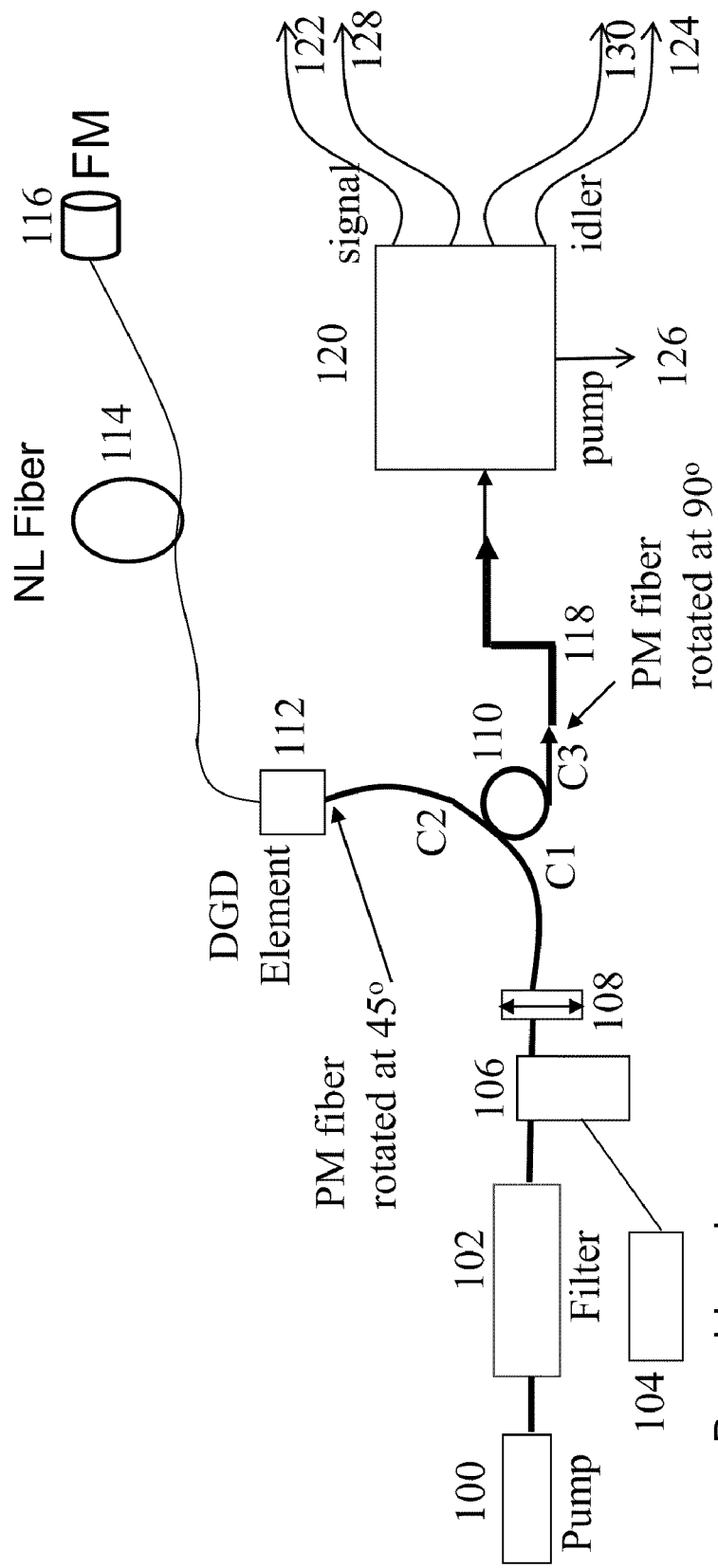
FIG. 2. Michelson interferometer-based entangled photon source including a broad-band alignment source 104 to aid in alignment of the down-stream measurement apparatus.

As one embodiment of the invention we consider a Michelson interferometer based entangled photon architecture as shown in FIG. 2. Pump laser pulses are generated in the pump laser 100 and filtered through a pump filter 102 to specify the optical bandwidth and reduce stray light. The pump light is combined with an alignment source 104 using a combiner 106, which could be a wavelength division multiplexer or a simple fiber coupler. Note that the alignment source is preferably a broad-band source of photons including photons in the signal and idler band, as can be realized for instance by a light emitting diode.

A polarizer 108 may be used after the combiner to define the polarization, particularly if the alignment source is inherently depolarized. We note that either polarization maintaining (PM) fiber could be used to preserve the pump polarization from the pump laser 100 to the initial polarizer 108 or single mode fiber (SMF) could be used and the optical polarization controlled via a polarization controller to adjust the polarization of the pump light so that is passes through the polarizer. In the latter case, some mechanism of measuring how well the polarization is aligned can be used, such as using a polarization beam splitter as the polarizer and minimizing the reflected power (thus maximizing the transmitted power) off the splitter. Another option is to use a polarization maintaining tap after the polarizer to monitor the transmitted power, or to monitor the pump light propagating through the entire system which is later dropped out using a wavelength division multiplexing filter 120. Using standard fiber with such a monitor and a polarization controller in lieu of PM fiber can minimize power fluctuations that can occur when connecting multiple PM components together due to slight mis-matches between the various PM axes. However, we omit that function in the figure for the simpler and functionally equivalent method of assuming all PM connections. If all components connecting the alignment source to the pump source have PM fiber connections then it is possible to put the polarizer directly after the alignment source, or to use a polarized alignment source and omit the polarizer, since the fiber PM axis then defines the preferred polarization direction.

The fiber after the polarizer 108 is PM fiber, and it leads to a PM fiber circulator 110. The polarizations of the pump and alignment source optical signals are co-polarized into the PM axis of the circulator, and represent a preferred polarization direction. The circulator sends the light from the input port C1 to port C2. The circulator will also direct light coming into port C2 to the output port C3. The PM port C2 is connected to a differential group delay element (DGD) 112. The DGD element has a different propagation delay for optical signals aligned parallel or perpendicular to its optical axis. The PM fiber at port C2 is aligned at 45 degrees to the DGD optical axis so that the input light signal is split 50/50 into the parallel and perpendicular axes, thereby separating input pump pulses in time into two orthogonally polarized pulses. Thus the DGD element splits the pump into two distinct modes, where each mode will be used to generate photons at the signal and idler wavelengths in a nonlinear fiber 114. It is useful for the time delay of the DGD element to be longer than the temporal resolution of the single photon detectors used to eventually detect the entangled states. For instance, a 1 ns delay is adequate for single photon detectors with ~1 ns temporal detection windows. The delay τ between the two pulses is a variable, and is typically set so that Raman generated pulses which will exit the system separated by a time τ from the entangled pulses can be rejected by the time-resolution of the measurement equipment. The DGD element can be realized, for instance, by using a polarization beam splitter and Faraday rotators or via a birefringent crystal.

After the DGD element the pump is split into two pulses of opposite polarization spaced by time τ. The fiber can now be single mode fiber (SMF), since any birefringence in the fiber between the DGD element 112 and the Faraday mirror 116 will be compensated by the action of the Faraday mirror 116, which reflects light in the orthogonal polarization as the incident light. The pump pulses initiate a four-wave mixing based nonlinear interaction in the nonlinear fiber 114, are retro-reflected in orthogonal polarizations via the Faraday mirror 116, propagate back through the nonlinear fiber and are then recombined in the DGD element. After back-propagating through the DGD element the four-wave mixing signals, which had been generated along two orthogonal polarizations that are separated in time, are re-combined into a single temporal location. The signal and idler photons are now entangled.

The entangled light then passes back through the circulator 110 to the circulator output port C3. This port may use PM fiber 118 and, if so, it can be oriented such that the effective polarization mode dispersion (PMD) experienced from the input of the circulator through the system and to the output of the circulator is compensated. Polarization mode dispersion causes a relative time delay between two orthogonal polarizations of light and can reduce the quality of the entanglement. Additionally, PMD causes the system to be more sensitive to temperature fluctuations which is undesirable. A typical compensation implementation would rotate the PM fiber 90 degrees at C3 so that the fast and slow axis are reversed, thereby counter-acting PMD at the input PM fiber. By choosing the length of PM fiber at C3 appropriately, the PMD through the system can be compensated.

The signal, idler, and pump wavelengths are separated at a wavelength division multiplexing (WDM) filter 120. The WDM filter 120 separates the signal and idler wavelengths, which can be multiple bands. For instance in FIG. 2 there are two signal bands 122,128 and two idler bands 124,130 where the entangled photon pairs are observable between wavebands symmetrically located with respect to the pump, for instance between 122 and 124 as well as between 128 and 130, where 122 is located at an optical frequency +δ from the pump and 124 is located at an optical frequency −δ from the pump and 128 is located at an optical frequency +2δ from the pump and 130 is located at an optical frequency −2δ from the pump. The WDM filter also isolates the signal and idler wavelengths from any pump leakage. The pump is dropped at the drop port 126 of the WDM filter. Optionally, if the signal and idler are being transmitted across the same fiber, they do not have to be separated at the source. Instead they can be separated at the detection apparatus or at any convenient location. Once separated the signal output 122,128 and the idler output 124,130 are available for detection.

The external alignment source 104 can be used to generate a polarized output signal helpful for aligning the down-stream polarization analyzer which is used to measure the entangled light. A preferred alignment source would be a broadband source such as that which can be realized from a light emitting diode or the amplified spontaneous emission from an Erbium-doped fiber amplifier or a semiconductor optical amplifier. A depolarized broadband source can track the birefringence seen by the signal and idler wavelengths since the broadband source is polarized by the polarizer 108 which sets a preferred state of polarization and later filtered by the WDM filter 120 that also filters the signal and idler photons. Thus the alignment light has the same state of polarization as the pump and the same spectral properties as the signal and idler. Any injected alignment signal is reflected back by the Faraday Mirror 116 into the PM axis of the C2 port of the circulator. The polarization transformation of light polarized along this PM axis as it propagates to the polarization analyzers prior to detection is thus tracked by the alignment signal. This transformation specifies two degrees of polarization freedom. The third degree of freedom is the relative phase shift between this light and the light polarized in the direction of the orthogonal PM axis (orthogonal to the axis the injected alignment signal is aligned with). This final degree of freedom can be determined in various ways, including by using the measurements of the entangled light itself. We note that a polarization switch could be inserted before the DGD element if one wants to be able to switch from an entangled source to a correlated photon source, where the switch is configured to either keep the pump light along the DGD optical axis, forming just one pump mode and generating a correlated output signal, or to split the pump light equally between the axis parallel and perpendicular to the DGD optical axis, forming two pump modes and generating an entangled output signal.

Figure 1:
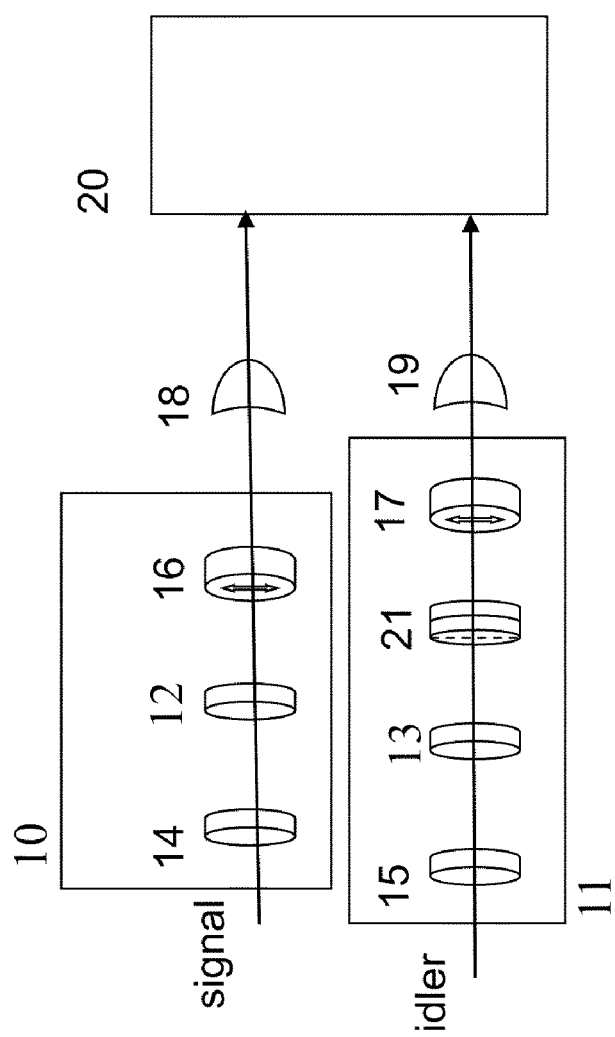
FIG. 1. Polarization analyzer for measuring entangled states.

The alignment source can be turned on and the pump turned off in order to align the two degrees of freedom of the downstream polarization analyzers, then the alignment source can be turned off and the pump turned on to generate the desired entanglement. FIG. 1 shows one type of polarization analyzer useful for this source, although other types could also be applied. The signal and idler arms are arbitrarily assigned to the two paths shown. The alignment signal allows the polarization controllers represented by QWPs 14,15 and HWPs 12,13 to align the polarized alignment signal to the polarizers 16,17. The variable phase shifter 21 can be aligned by rotating the polarizers 16,17 by 45 degrees, turning the pump light on and the alignment light off, and setting the variable phase to maximize coincidence counts. This process sets the third polarization degree of freedom to the correct value. We note that during this process of aligning the polarization analyzers using the pump light it is beneficial for the pump light to be very intense so as to increase the coincidence count rate. When actually producing entangled light, the pump power may need to be reduced in order to maintain high quality entanglement. Thus the invention can control the pump power either directly, for instance by changing the current to the pump laser, or indirectly for instance by changing the polarization of the pump using the polarization controller 106 thereby changing the fraction of the pump power that is sent to the nonlinear fiber, so as to adjust the pump power to the optimal level for either alignment or entanglement purposes. The alignment light source should be switched off when entanglement measurements are being conducted so as not to interfere with the measurement.

A basic alignment procedure is as follows. The EP source is set to output the alignment signal. The rotatable polarizers are oriented at 0 degrees to pass the V polarization, also referred to as −S1 when referenced to the Poincaré sphere. The various QWPs and HWPs are optimized so that the alignment source light is maximally attenuated through both the signal and idler analyzers. At this point the analyzers are aligned such that a two-photon interference fringe can be observed in one basis direction when recording the coincidence counts as a function of the angle of one of the rotating polarizers. The user can simply turn off the alignment light, turn on the pump light, and record the co-incidence counts as a function of the rotatable polarizer angle to record a two-photon interference fringe. This fringe is in the V (vertical)

basis, since one of the polarizers is fixed in the vertical direction. The fixed polarizer could also be rotated 90 degrees and a fringe could be taken in the horizontal basis. If one wants to measure a two-photon interference pattern in a different basis, an additional adjustment is made in order to set the phase between the H and V axis as defined by the DGD element, which define the polarization of the two pump modes. Both rotatable polarizers are rotated 45 degrees to the S2 direction on the Poincaré sphere. This represents the D (diagonal) basis. The D basis is a combination of the S1 and −S1 polarizations, and it is the phase difference between these polarizations that is not yet accounted for. This phase can be set by maximizing the coincidence count rate while changing variable retardance of the variable waveplate 21 when its optical axis is aligned to the H or V polarization, thereby controlling the relative phase shift between H and V polarizations. After this adjustment a two photon interference can then be taken by rotating the rotatable polarizer while the other rotatable polarizer is fixed at 0 degrees (V) or at 45 degrees (D) or at any other angle. Note that this alignment procedure starts with minimizing the received power from a classical alignment source. The only coincidence count optimization using the entangled light is the setting of the variable waveplate, which is just a single parameter optimization. Thus only one parameter is adjusted using the more fragile entangled light. The pump power can be increased to a very high value during this alignment phase in order to have the largest possible coincidence count rate. The pump power can then be reduced to the value required in order to get high quality entanglement. We will later describe how the entire alignment procedure can be performed using classical polarized light, if there are at least two non-orthogonal output polarizations which can be selected as the alignment signal.

Figure 3:
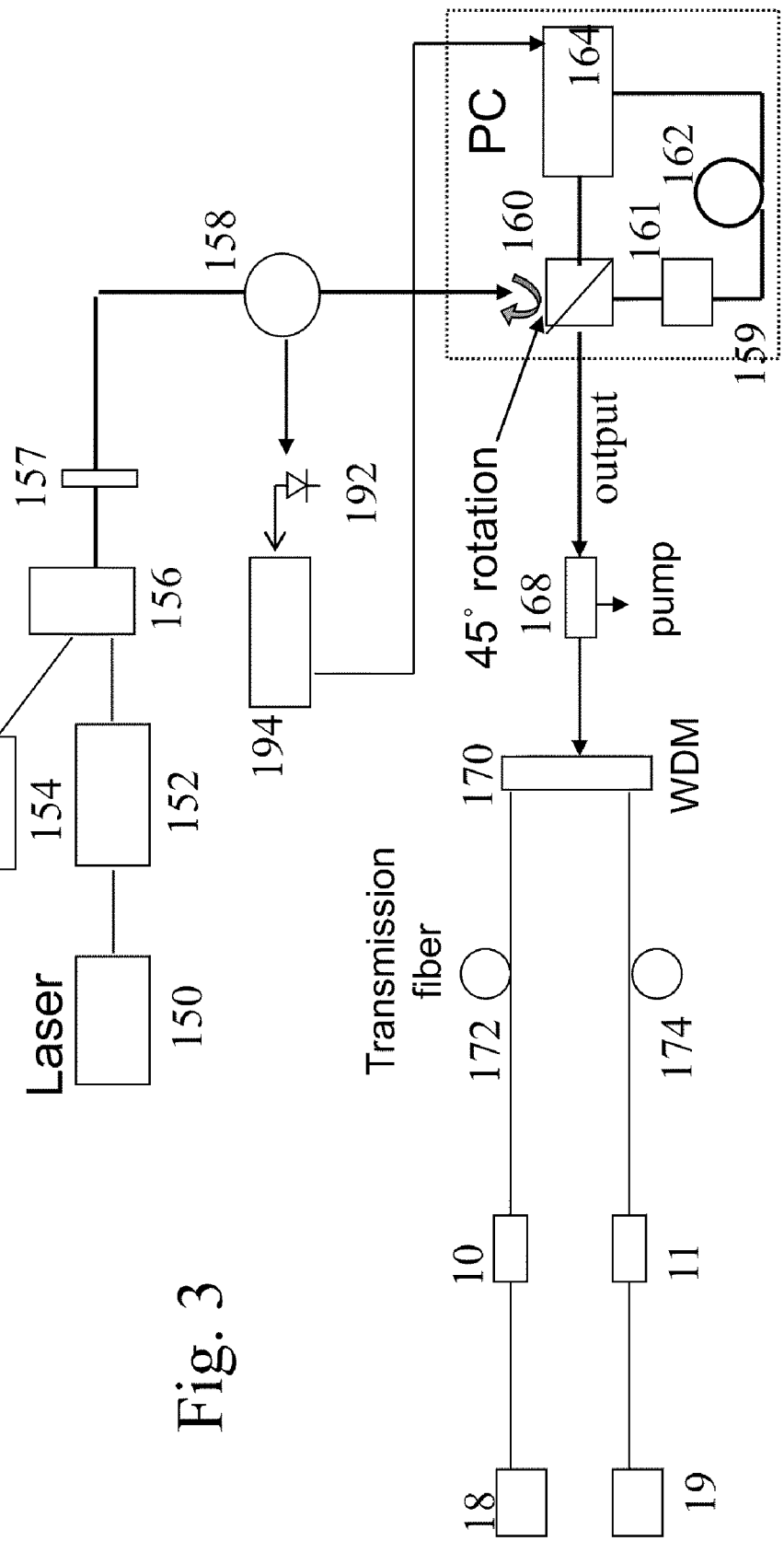
FIG. 3. Sagnac loop based entangled photon source including a broad-band alignment source 154 and containing accessible signals to allow for the monitoring of the setting of the internal in-loop polarization controller 164.

FIG. 3 shows an EPS architecture using a Sagnac-loop scheme. Similar to the previous design described in FIG. 2, this invention makes use of a broadband alignment source 154. Again we have a pump laser 150, filter 152, and combiner 156 where the combiner combines the pump light with an alignment source 154. A polarizer 157 passes the pump laser light and polarizes the alignment source to be the same polarization as the pump laser. The polarizer sets a preferred polarization direction for the EPS system. Again we will assume all PM fiber connections, although the use of a polarization controller and a polarizer could allow for SMF connections between the laser and the polarizer instead. Note that when using PM fibers the polarizer could also be located directly after the alignment source 154 and before the combiner 156 since the pump laser light and alignment source would be combined in the combiner 156 with their respective polarizations preserved and exit the combiner with identical polarizations. The light travels through a PM circulator 158 and into a polarization Sagnac loop 159 defined by a polarization beam splitter 160. A polarization controller 164 is located inside the Sagnac loop which is used to set the loop to transmit the incident pump or alignment signals. The purpose of the circulator is to allow the small amount of light that will be retro-reflected from the Sagnac loop due to imperfect setting of the internal polarization controller 164 to be monitored. Other means of monitoring the reflected light could be used, such as inserting an optical tap instead of the circulator. Additionally, the system could also be aligned by maximizing the transmitted pump light at the drop port of the pump add-drop filter 168 which drops the pump wavelength. The benefit of so doing is to eliminate the circulator and to make the size of the feedback signal larger thereby yielding a high signal-to-noise ratio. However the drawback is that the transmitted light needs to be tracked with high accuracy since only very small changes in the transmitted light level can result in poor system performance. In the design of FIG. 3 there are no PM fibers which are intentionally excited along both PM axes, so there is effectively no PMD in the line. The PM fiber is rotated at a polarization beam splitter 160 by 45 degrees such that the pump light is split nearly equally between the clock-wise and counter-clock-wise directions in the Sagnac loop, forming two pump modes which will pump the nonlinear fiber 162 in order to generate the signal and idler photons. A polarization controller 164 in the Sagnac loop allows for the loop birefringence to be set correctly. For instance, a typical operating condition would align the polarization controller such that both the clock-wise and counter-clock-wise propagating pump pulses pass through the polarization beam cube to exit to the output of the Sagnac loop, then propagating through the pump add-drop filter 168. This polarization controller setting thereby minimizes the amount of light reflected back to the pump source. The setting of the polarization controller can be continually monitored by measuring the re-reflected light at the photodetector 192 which is siphoned off by the circulator 158. The detected signal is minimized (thereby maximizing the transmitted pump) using feedback electronics 194 to control the internal polarization controller 164. The feedback electronics 194, which can contain a digital processor, can use the processor to implement an algorithm to determine if an adjustment to the in-loop polarization controller 164 is required. For instance, if the reflected light exceeds some programmable threshold value, where the threshold chosen may depend on the power setting of the pump laser, an alarm can be raised which causes the in-loop polarization controller to be readjusted and the system to optionally re-enter calibration mode since changes in the in-loop polarization controller can also disturb the polarization analyzer alignment. The feedback electronics with the desired feedback parameters form a control unit that controls the polarization controller to maintain the desired operating point.

A loss compensator 161 is used, if necessary, to balance the loss between the PBS 160 and the nonlinear fiber 162 from both ends. It effectively compensates for imbalanced losses such as the insertion loss of the polarization controller 164. An imbalanced system can make alignment more difficult because the pump photons acquire a different nonlinear phase shift during propagation through the nonlinear fiber in each direction causing the pump and alignment signal to have different propagation characteristics which makes the polarization of the alignment signal with respect to the two pump modes less repeatable. Imbalance in the loss can also cause the generated H and V photons to experience different amounts of attenuation and thus reducing the quality of the entanglement.

The pump add-drop filter 168 drops the pump wavelength and the wavelength division demultiplexer (WDM) 170 separates the signal and idler wavelengths. These functions could be combined in one filter and their respective locations could be switched. After propagating through the transmission fiber 172,174 the signal and idler photons enter their respective polarization analyzers 10, 11 and are detected with single photon detectors 18, 19.

Figure 4:
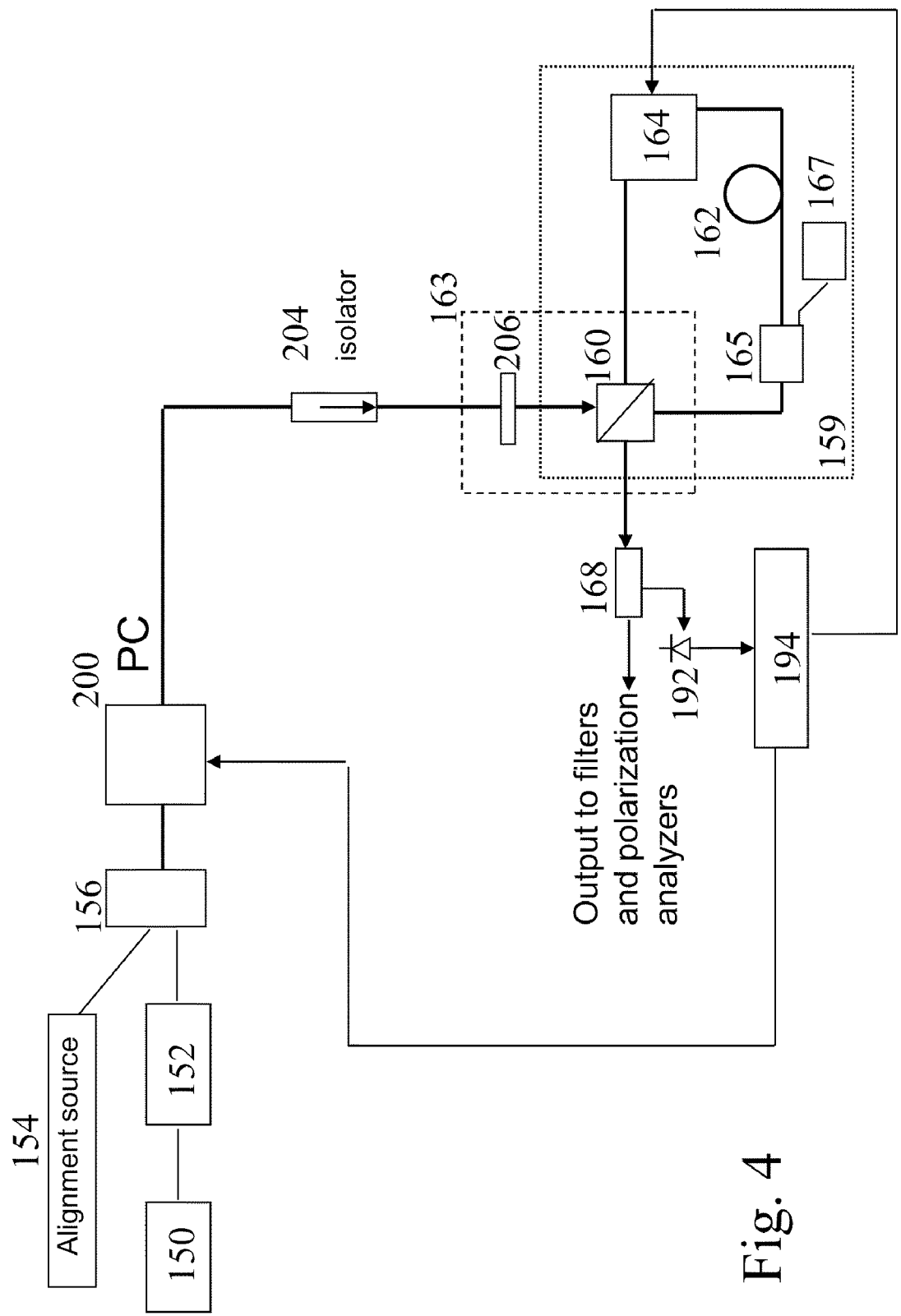
FIG. 4. Sagnac-loop based entangled photon source architecture that uses single mode fiber for all the components leading up to the polarizer 206 which defines the polarization into the Sagnac loop polarization beam cube 160. A polarization controller 200 is controlled via feed-back electronics 194 based off the feed-back signal generated from an optical-to-electrical detector 192 which monitors the pump light that passes through the Sagnac loop after it is dropped by an add-drop multiplexer 168.

A preferred embodiment of an EPS is shown in FIG. 4 where a polarizer 206 oriented at 45 degrees to the axes of the Sangac polarization beam splitter (PBS) 160 ensures a 50/50 splitting ratio of the pump light into the clock-wise and counter-clock-wise propagating modes in the Sagnac loop 159. The pump fiber polarization controller 200 is typically aligned in order to pass a maximum amount of pump through the polarizer, which can be monitored by observing the pump light dropped from the pump ADM 168 using an optical-to-electrical detector 192. The monitored signal can be sent to a feedback electronics block 194 acting as a control unit to control the in-loop fiber polarization controller 200 to set the pump fiber polarization controller 200 to the desired value. The same monitoring system also allows the in-loop polarization controller 164 to be set to maximize the power transmitted through the Sagnac loop. The two polarization controllers can be set sequentially. It may be necessary to optimize the polarization controllers iteratively since a particular initial setting of either polarization controller can minimize the pump light propagating through the Sagnac Loop 159 thereby killing the feedback signal. In this configuration it is also possible to use the pump polarization controller 200 in order to control the pump power entering the nonlinear fiber 162 in order to balance competing desires since higher pump power leads to higher entanglement pair production rates but also so lower quality entanglement due to multi-photon pair production. The pump power has a significant effect on the two-photon emission rate and on the quality of the two-photon interference fringe and a user may want to set the pump light power to a variety of levels when making measurements or performing an alignment. A broad band alignment source 154 is used in order to align the subsequent polarization analyzers. An additional advantage of this scheme is that the 45 degree polarizer 206 and the Sagnac polarization beam splitter 160 can be easily co-packaged in a single free-space device 163. The co-packaging is likely to lead to a lower manufacturing variance on the 50/50 splitting ratio than using a fiber-coupled polarizer with PM fiber output, where either the PM fiber from the polarizer or to the beam cube is rotated by 45 degrees to set the 50/50 power split, because there are fewer interfaces of polarization sensitive components, where each interface can have slight manufacturing misalignments. The method also allows for the use of less-expensive SMF components before the Sagnac loop such as the pump filters 152 and optional isolator 204. The pump and alignment source optics 150-156 are the same as in FIG. 3 and are thus labeled identically. The inclusion of an isolator 204 is optional to reduce light re-reflected back to the laser.

Figure 6:
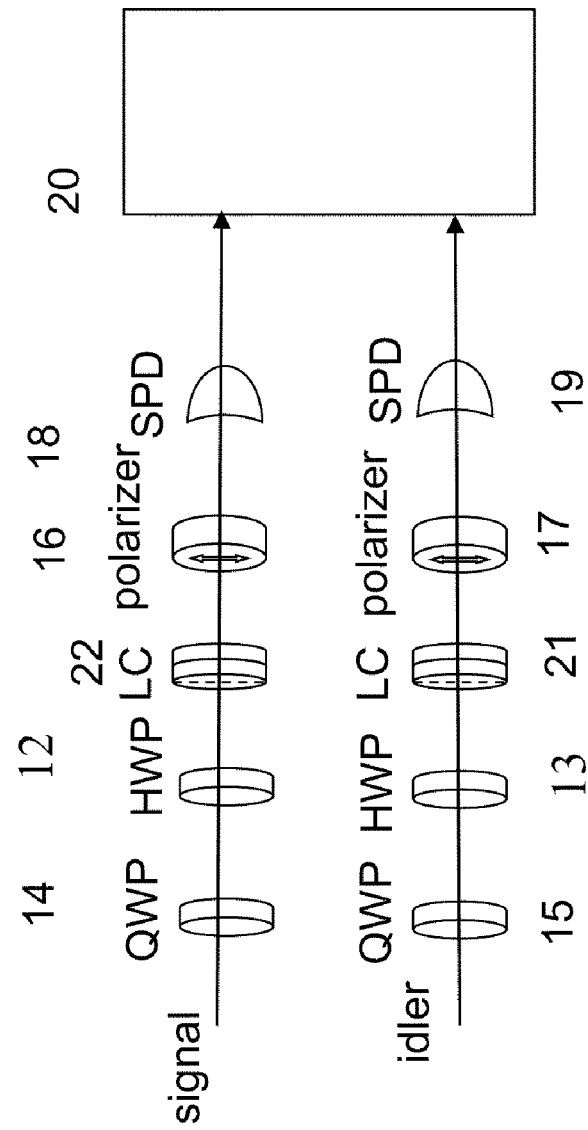
FIG. 6. Polarization analyzer system that can be used to align both the signal and idler analyzers using only singles counts from an alignment signal generated via the entangled source of FIG. 5.

An in-loop optical tap 165 and a second alignment source 167 are used to generate an output alignment signal defined along either the H or V axis of the Sagnac loop beam splitter 160. The first alignment source 154 is injected into the alignment port at the combiner 156 and generates a polarized output signal having a combination of H and V polarizations with a phase shift between the two. The second alignment source 167 is injected into the alignment injection port at the in-loop optical tap 165 to form an output signal with a polarization along either the H or V axis of the Sagnac loop beam splitter. By using both non-orthogonal alignment signals the polarization analyzers can be aligned using only the alignment sources and not requiring the use of coincidence counting. A polarization analyzer that could make use of this feature is shown in FIG. 6 and will be discussed later. The second alignment source could be realized by splitting the first alignment source into two ports and controlling the power of each port separately, or sending the output of the first alignment source into a 1×2 optical switch to determine which port to send the alignment light into, or by using two separate alignment sources and turning only one on at a time. It is useful to have only one alignment source injected into the system at a time so that the polarization of the polarized alignment signal at the output is predictable and can be selected between two different well defined non-orthogonal directions.

It is possible that the Sagnac Loop PBS 160 has some PMD. Ideally, the material and construction of the component is selected to avoid PMD, and the output fiber of the PBC is single mode fiber. However, if the PBS does have PMD one can choose to compensate for it by designing the output fiber of the PBS to be PM and orienting the output PM fiber in such a way as to compensate any residual PMD. Typically this will be done by orienting the output PM fiber such that the axis is along the H or V axis defined by the principle axis of the PBS and selecting its length such that the PMD of the fiber and the PMD of the PBS cancel out.

Figure 5:
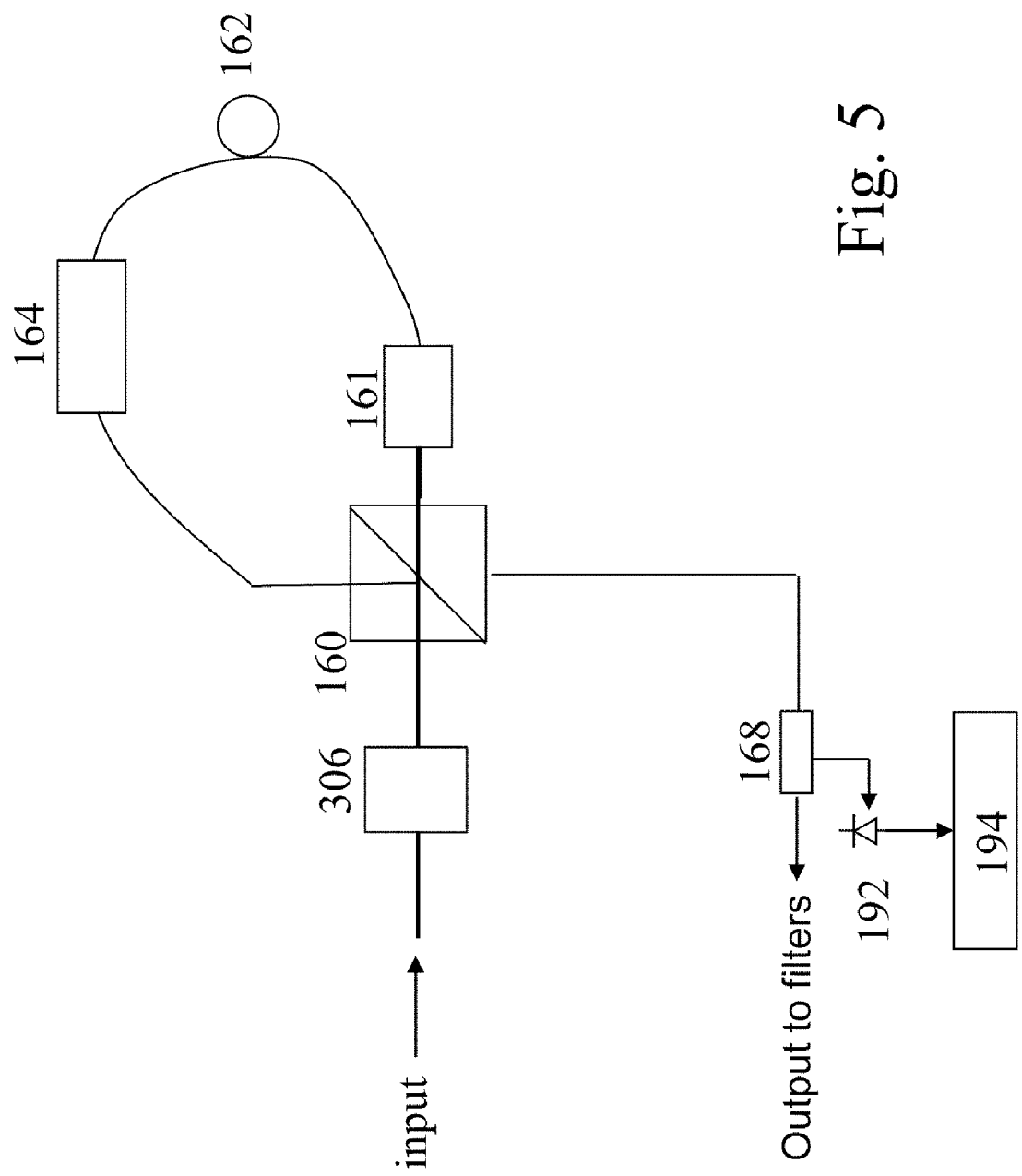
FIG. 5 shows a simplified diagram of a Sagnac-loop based entangled photon source or quantum correlated photon source that uses a phase shifter 306 such as a liquid crystal to control polarization entering the Sagnac loop and therefore the splitting ratio of the pump signal traveling clockwise and counter-clockwise around the Sagnac loop.

The design of FIG. 5 depicts an embodiment which can set the splitting ratio into the Sagnac loop to a desired value. Here the pump source is coupled into the polarization beam splitter of the Sagnac loop 160 through a variable phase-shifter 306. The phase shifter can have its optical axis oriented, for example, along the S2 (Diagonal, or D) axis of the Poincaré sphere, such that it is halfway between the S1 and −S1 (H and V) axis. The light input to the phase shifter is polarized along the S1 (or −S1) axis, so that changing the phase to the phase shifter will cause the light into the Sagnac PBS 160 to vary on a Great Circle on the Poincare sphere that connects the H and V (S1 and −S1) polarizations. Thus, by setting the variable phase shifter appropriately the splitting ratio of the pump can be continuously adjusted from 100% in one direction to a 50/50 splitting ratio or any splitting ratio in between. The phase shifter is thus a particular kind of polarization controller, where the output state can be deterministically set such that the splitting ratio is known based on the control signal to the phase shifter. This is an open loop setting, where the splitting ratio does not need to be measured and used as a feed-back signal in order to set to a given splitting ratio. The Sagnac loop contains, as before, a polarization controller 164, a nonlinear fiber 162, and an optional loss-balancing element 161. An optical-to-electrical detector 192 and feedback electronics 194 are shown in the figure, which in can be used to monitor and control the setting of the in-loop polarization controller 164 and the pump power entering the system, similar to previously described embodiments.

This architecture of FIG. 5 allows the signal and idler polarization analyzers, assuming they have enough control over their polarization degrees of freedom as does the measurement system of FIG. 6, to be set to measure a given basis state using only optical power measurements. This is an improvement over using slower and more erratic co-incidence count measurements. The measurement system is nearly identical to the polarization analyzer of FIG. 1, except there is now a variable phase shifter realized by a liquid crystal 22 in the signal arm as well. The liquid crystals 21, 22 and the polarizers are initially aligned so that their optical axes are aligned. The phase shifter 306 is set for a 100% splitting ratio using either the alignment source or the pump source. The pump source can be used if desired since a 100% splitting ratio will create polarized signal and idler outputs, however it is easier to generate larger power levels in the signal and idler bands using an alignment source, so we will assume the alignment source is used. The waveplates 14,12, 15,13 can then be adjusted to minimize the singles counts generated from the alignment source. The phase shifter can then be set for a 50/50 splitting ratio. The polarizers 16, 17 can be rotated 45 degrees and the phase shifters 21,22 are adjusted to again minimize the singles counts at the respective single photon detectors 18,19. The alignment source is switched off and the pump source is enabled in order to generate entangled light.

The ability to control the splitting ratio also allows for alignment signals to be generated using only the generated four-wave-mixing signals from the pump light. This is because the polarization analyzers can be aligned to the generated four-wave-mixing light when the phase shifter 306 is adjusted to send all pump light in one direction. This makes the generated four-wave-mixing polarized so that the polarization analyzers can be aligned to the H or V basis. The pump light can then be split 50/50, in which case the final step of aligning the phase between the H and V basis can be done by adjusting one of the phase shifters 21 or 22 to maximize coincidence counts after the polarizers are rotated 45 degrees. Because this method of alignment uses coincidence counts instead of just local singles counts (or power measurement), it is preferable to use the alignment source.

If pump light is used, it is beneficial to increase the pump light to a high level for the alignment procedure so that the rate of incoming signal and idler photons is increased. When high quality entanglement is desired, the pump power can be reduced as needed in order to reduce the deleterious multiphoton effect. We note that the QWP/HWPs can be replaced with uncalibrated style polarization controllers, such as those based off of fiber squeezers, which are likely lower loss and less expensive options. An uncalibrated polarization controller suggests that the knowledge of the polarization transformation (i.e. Jones or Mueller matrix transformation) of the polarization controller as a function of control signal (such as voltage control) is not required.

Figure 7:
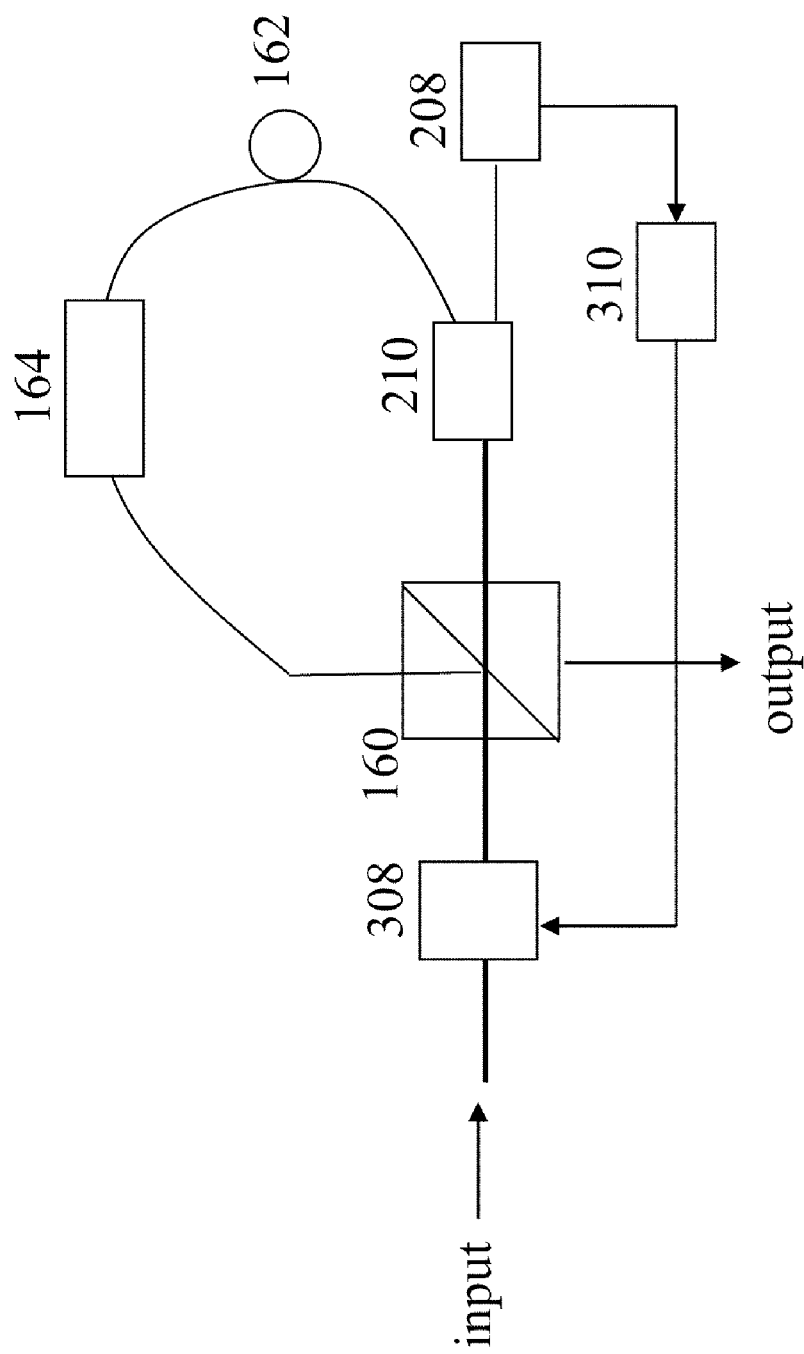
FIG. 7 shows a quantum correlated or quantum entangled source generator, where a polarization controller 308 is used in conjunction with an in-loop tap 210, optical detector 208, and feedback electronics 310 to set the splitting ratio into the Sagnac loop as desired.

Another embodiment shown in FIG. 7 uses an uncalibrated fiber polarization controller 308 to control the pump splitting ratio. The use of an uncalibrated polarization controller is allowable since in this embodiment the splitting ratio is monitored with an in-loop tap 210. The output from the tap is monitored using an optical-to-electrical converter 208 and sent to feedback electronics 310 which control the polarization controller 308. The tap can replace the loss-compensator 161, with the tap ratio chosen to balance the loss in each direction. A typical tap ratio may be 1-5%, chosen to match the loss of the in-loop polarization controller and also to maintain a reasonable sized tap signal while not adding too much loss to the loop. The tap can monitor the optical power propagating in one direction of the loop as in FIG. 7, or a 2×2 tap can be used to monitor the optical power in both directions. The fiber polarization controller 308 can be tuned to find the maximum and minimum optical power levels. In either case the optical signal travels through the loop almost entirely in one direction. The polarization analyzers can then be aligned to this polarization in order to generate a polarized output along the H or V direction. The output will be so polarized with either a pump or alignment signal as an input. The downstream measurement apparatus can be aligned to this polarized signal. Then the fiber polarization controller 308 can be tuned for a 50/50 split so that the power in one direction as monitored by the monitor unit formed by the tap 210 and detector 208 combination is half of the maximum power level attainable. Other split levels could also be selected, with 50/50 being the most common. An alignment input signal now produces a polarized output signal with equal components in the H and V directions. The phase shifters on the downstream measurement apparatus can be set similar to the embodiment that used a calibrated phase shifter. Effectively, the inclusion of the monitor unit to monitor the splitting ratio and the control unit to control the splitting ratio allows this embodiment to operate in a smilar way as if a calibrated phase shifter was used, however the polarization controller 308 does not need to be calibrated and the input polarization to the polarization controller 308 does not need to be known.

The feedback electronics 310 that controls the uncalibrated polarization controller 308 and which serves as a control unit can save the control signal parameters applied to the polarization controller and thus switch between the two different splitting ratios (100% and 50%) in order to periodically realign the polarization transformation at the detection apparatus to periodically account for the changing polarization transformation typically seen over time in the distribution fibers that connect the EPS to the measurement apparatuses. The alignment source can be turned on periodically to aid in alignment, such that alignment signals are time multiplexed in a predicable way with the entangled light. For instance, the device could be pumped with the pump laser with the polarization controller set for a 50/50 power split for 100 milliseconds to measure entangled light. Then the alignment source could be turned on and the splitting ratio could be changed to 100% for 50 milliseconds followed by changing the splitting ratio to 50/50 for 50 milliseconds in order to realign the polarization analyzers. The alignment source could then be switched off to again measure entanglement. The actual length of time any particular setting is maintained will depend on the speed of the polarization controllers and the signal size at the detector.

Figure 8:
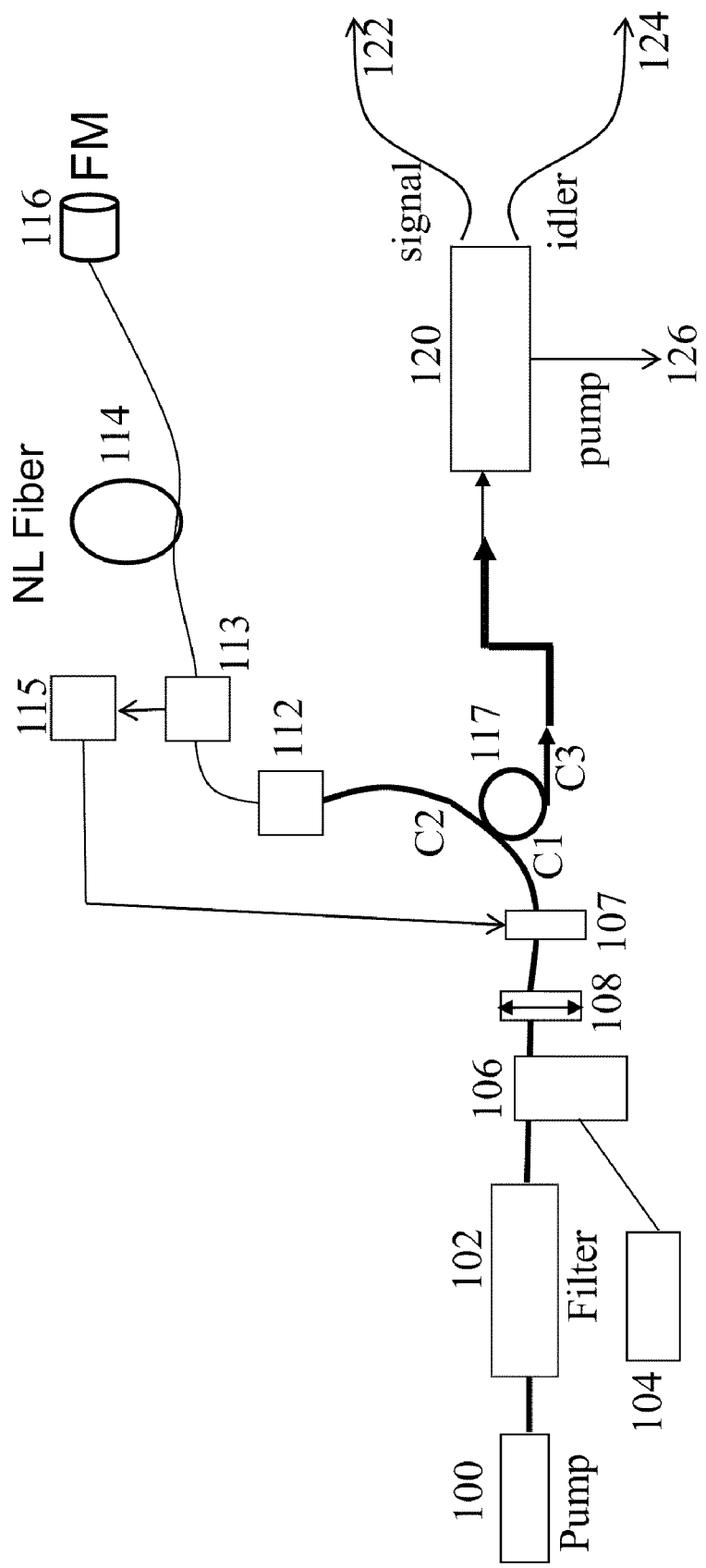
FIG. 8. Entangled photon source architecture, where an axis splitting monitor 113 is used to monitor the splitting ratio of the input optical signal into the DGD element 112, and the information is fed back to the polarization controller 107 through a control unit 115 to select the desired split ratio.

A similar EPS which uses a monitor unit and control unit to determine the splitting ratio of the two constituent polarization modes that excite the nonlinear fiber via a four wave mixing process which are later recombined in order to generate entanglement can also be implemented in other types of interferometers other than the Sagnac loop. As an example, FIG. 8 shows a system which modifies the architecture of FIG. 2 by including a monitor unit that is realized as an axis splitting monitor 113. The axis splitting monitor 113 could be realized in this geometry as a 1% optical tap leading to a fast photodetector that can resolve both the time separated pulses out of the DGD element 112. The output of the photodetctor is sampled by an analog-to-digital converter inside the axis splitting monitor 113 at the peak of both pulses. This allows for the splitting ratio to be determined by comparing the magnitude of both pulses. The results can be averaged over time to get an accurate reading. The splitting value determined by the axis splitting monitor is used by the control unit 115 to set the polarization controller 107 to a desired splitting ratio. We note that the circulator 117 in this case can use single-mode fiber instead of the PM fiber used in FIG. 2.

The present invention has been described with reference to the accompanying drawings, in which the preferred embodiments of the invention are shown. This invention may, however, be embodied in many different forms and should not be construed as limited to the embodiments set forth herein.

What we claim is:

1. An apparatus for producing entangled photon pairs, comprising:
    a source of a plurality of pump photons; a splitter for splitting the pump photons into two modes each of which generates new optical photons at the signal and idler wavelengths via a nonlinear interaction in an optical fiber; a recombiner for recombining the two modes creating the output entangled signal and idler photon pairs; at least one external optical alignment source which is independent from the pump source; the alignment source emits photons in the signal and idler wavelength bands; the alignment source photons being combined with the pump source photons using a combiner; and the resulting optical alignment output is polarized with a fixed relationship to the two pump modes; wherein the addition of the alignment source in the apparatus facilitates measuring the entangled light.

2. The apparatus according to claim 1, wherein the alignment source is a broad band source independent from the pump source.

3. The apparatus according to claim 1, wherein the power levels of the pump source and the alignment source are adjustable independently.

4. The apparatus according to claim 1, wherein there are multiple ports for injecting alignment photons; and the alignment photons are injected predominantly into one alignment port at a time, wherein injecting alignment photons into different ports generates alignment signals of different polarization.

5. The apparatus according to claim 1, wherein the alignment source is a light emitting diode.

6. The apparatus according to claim 1, wherein the alignment source is the broadband amplified spontaneous emission from an optical amplifier.

7. The apparatus according to claim 1, further comprising: two subsequent measurement apparatuses, one which has the signal photons as an input and one which has the idler photons as an input, each consisting of a polarization transformation system and a polarization projection device, wherein said apparatuses determine an initial polarization transformation of the entangled input photons so as to specify the measurement, wherein the setting of the initial polarization transformation is determined at least in part by measuring the polarized alignment output photons generated by the alignment source.

8. The apparatus according to claim 7, wherein output alignment signals of two different polarizations can be generated by injecting a broadband alignment signal into one of two different input ports, and the two alignment polarizations are used to completely determine the transformations of the measurement apparatuses.

9. The apparatus according to claim 7, wherein correlations between the generated signal and idler photons are used to determine the transformations of the measurement apparatuses.

10. The apparatus according to claim 1, wherein the entangled output light is split into multiple signal and idler wavebands by an optical filter, and wherein the alignment source has output photons in each of the wavebands.

11. Method for producing entangled photon pairs and a polarized alignment signal, comprising: producing a plurality of pump photons; splitting the pump photons into two modes each of which generates new optical photons at the signal and idler wavelengths via a nonlinear interaction in an optical fiber; recombining the two modes creating the output entangled signal and idler photon pairs; producing a plurality of alignment photons in the signal and idler wavelength bands using at least one external broadband optical alignment source which is independent from the pump source; injecting the alignment photons so at the output they have a fixed polarization with respect to the two pump modes; the addition of the alignment source in the apparatus facilitating measuring the entangled light.

12. Method of claim 11, wherein the alignment source is a broad band source;
and further comprising: filtering the alignment source to isolate the light in the signal and idler photons band.

13. Method of claim 11, further comprising: measuring the polarized alignment source photons in the signal and the idler bands using a polarization transformation followed by a polarization projection; determining the desired polarization transformation from the measurement; setting the polarization transformation to the desired value; then measuring the entangled photons using said transformation.

14. Method of claim 11, further comprising: splitting the entangled output light into multiple signal and idler wavebands by an optical filter.

15. Apparatus for producing entangled photon pairs and a polarized alignment signal, comprising: a pump laser source producing a plurality of photons and an alignment source separate from the pump source, producing at least one output alignment beam, where the pump photons are split by a polarization beam splitter into two beams with counter-propagating directions inside a Sagnac loop containing a nonlinear optical fiber; the pump source being used to generate a nonlinear interaction in an the optical fiber and the alignment source being used to generate a plurality of photons in the signal and idler wavelengths producing a polarized output that is polarized with a polarization related to the polarization of the polarization beam splitter, the apparatus outputting either a beam of entangled photon pairs or a polarized alignment signal.

16. The apparatus of claim 15, further comprising: a switch turning the alignment source on or off; the apparatus producing a polarized optical signal when injected with alignment source photons.

17. The apparatus of claim 15, wherein the pump light reflected from the Sagnac loop is monitored via in-loop tap in order to control a polarization controller inside the Sagnac loop to minimize the reflected power.

18. The apparatus of claim 17, wherein the polarization controller inside the Sagnac loop is adjusted when the reflected pump light exceeds a specified threshold level.

19. The apparatus of claim 18, wherein an alarm is raised to indicate that the Sagnac loop polarization controller has been adjusted so that any subsequent measurement apparatus may be optionally realigned.

20. The apparatus of claim 15, wherein the pump light transmitted from the Sagnac loop is monitored in order to provide a feedback signal to feedback electronics which control a polarization controller inside the Sagnac loop to maximize the pump power transmitted through the loop.

21. The apparatus of claim 15, wherein the pump light through the Sagnac loop is monitored at a wavelength division multiplexing add-drop filter that drops the pump wavelength.

22. The apparatus of claim 15, wherein a loss compensator is used in order to balance the power entering the nonlinear fiber in both the clock-wise and counter-clockwise propagating pump photons.

23. The apparatus of claim 15, wherein a polarizer is aligned to the polarization beam splitter such that the pump light is split into two counter-propagating beams of approximately equal power.

24. Method for producing entangled photon pairs, comprising: producing a plurality of pump photons; producing an alignment source beam from an alignment source being separate from the pump source; splitting the pump photons in a polarization beam splitter into two beams propagating in counter-propagating directions inside a Sagnac loop containing a nonlinear optical fiber; generating a nonlinear interaction in an the optical fiber creating photons at the signal and idler wavelengths; outputting a beam of entangled photons; generating a plurality of photons in the signal and idler wavelengths from the alignment source beam, the alignment signal and idler photons being polarized at the output with a polarization related to the polarization of the polarization beam splitter; wherein the addition of the alignment source in the apparatus facilitates measuring the entangled light.

25. The method of claim 24, further comprising:
two different input ports for injecting alignment source photons where the subsequent polarized alignment signal has a different polarization depending on which port the alignment photons are injected into, with alignment light being injected into one port at a time to generate alignment signals of different polarizations for facilitating measurements of the entangled light.

26. The method of claim 24, wherein the output photons are filtered into multiple wavebands to produce multiple bands of entangled pairs and alignment photons with the same wavelengths as the entangled photons.

27. The method of claim 24, further comprising: providing a feedback signal to feedback electronics which control the polarization controller inside the Sagnac loop to maximize the pump power transmitted through the loop.

\* \* \* \* \*